(12) United States Patent
Iguchi (10) Patent No.: US 9,285,866 B2
(45) Date of Patent: Mar. 15, 2016

(54) INFORMATION PROCESSING APPARATUS WITH POWER SHUTOFF SWITCH AND CONTROL METHOD THEREFOR FOR REDUCING POWER CONSUMPTION IN AN IMAGE FORMING APPARATUS

(71) Applicant: CANON KABUSHIKI KAISHA, Tokyo (JP)

(72) Inventor: Junji Iguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 13/741,200

(22) Filed: Jan. 14, 2013

(65) Prior Publication Data

US 2013/0219202 A1  Aug. 22, 2013

(30) Foreign Application Priority Data

Feb. 16, 2012  (JP) ................................. 2012-031372

(51) Int. Cl.
*G06F 1/32* (2006.01)

(52) U.S. Cl.
CPC ............ *G06F 1/3246* (2013.01); *G06F 1/3284* (2013.01)

(58) Field of Classification Search
CPC ........ G06F 1/32; G06F 1/3246; G06F 1/3284
USPC ............................................. 713/3, 320, 324
See application file for complete search history.

(56) References Cited

U.S. PATENT DOCUMENTS

| | | | |
|---|---|---|---|
| 2003/0202296 A1 | 10/2003 | Hamano | |
| 2005/0077882 A1* | 4/2005 | Nishino | 323/222 |
| 2005/0262367 A1* | 11/2005 | Shih | 713/323 |
| 2010/0226060 A1* | 9/2010 | Kim | 361/160 |

FOREIGN PATENT DOCUMENTS

| | | |
|---|---|---|
| CN | 101089912 A | 12/2007 |
| CN | 202043361 U | 11/2011 |
| JP | 2000-152494 A | 5/2000 |

\* cited by examiner

*Primary Examiner* — Chun Cao
(74) *Attorney, Agent, or Firm* — Canon USA, Inc., IP Division (57) ABSTRACT

An information processing apparatus includes a switching unit configured to be an ON-state in which power is supplied to the information processing apparatus and an OFF-state in which power is not supplied to the information processing apparatus, a driving unit configured to set the switching unit to the off-state, a voltage supply unit configured to apply a voltage to the driving unit, and a control unit configured to, in a case where a condition for shutting off the supply of power to the information processing apparatus is satisfied, perform control to apply the voltage from the voltage supply unit to the driving unit, and, after the voltage is applied to the driving unit, control the driving unit to set the switching unit to the off-state.

10 Claims, 6 Drawing Sheets

| 1:IMAGE FORMING APPARATUS STATE | 21:PRINTING UNIT POWER OUTPUT | 22:READING UNIT POWER OUTPUT | 23:OPERATION PANEL POWER OUTPUT | 20:CONTROL UNIT POWER OUTPUT | 24:POWER SUPPLY SWITCH POWER OUTPUT |
|---|---|---|---|---|---|
| WAITING OR OPERATING STATE | ○ | ○ | ○ | ○ | × |
| POWER-SAVING MODE | × | × | ○ | ○ | × |
| AUTO SHUTDOWN EXECUTION STATE | × | × | × | ○ | ✱ |
| POWER OFF STATE | × | × | × | × | × |

INFORMATION PROCESSING APPARATUS WITH POWER SHUTOFF SWITCH AND CONTROL METHOD THEREFOR FOR REDUCING POWER CONSUMPTION IN AN IMAGE FORMING APPARATUS

BACKGROUND OF THE INVENTION

1. Field of the Invention

The present invention relates to an information processing apparatus including a switching unit that switches between supply and shutoff of power to the information processing apparatus, and a control method therefor.

2. Description of the Art

Conventionally, for realizing a power-saving apparatus, an apparatus has been known to include an auto-off driving circuit to automatically turn off a power supply switch when the apparatus is not operated for a predetermined time.

Japanese Patent application Laid-Open No. 2000-152494 discusses an apparatus capable of performing auto-off driving where the power supply switch is provided with a mechanical relay, which is driven by signal control at a power supply secondary side with the power supply switch turned on to turn off the power supply switch.

However, in a conventional image forming apparatus, since a voltage is always applied to the power supply switch, power consumption of the image forming apparatus is wastefully increased.

SUMMARY OF THE INVENTION

The present invention is directed to a mechanism for reducing power consumption in an image forming apparatus.

According to an aspect of the present invention, a switching unit configured to be an ON-state in which power is supplied to the information processing apparatus and an OFF-state in which power is not supplied to the information processing apparatus, a driving unit configured to set the switching unit to the off-state, a voltage supply unit configured to apply a voltage to the driving unit, and a control unit configured to, in a case where a condition for shutting off the supply of power to the information processing apparatus is satisfied, perform control to apply the voltage from the voltage supply unit to the driving unit, and, after the voltage is applied to the driving unit, control the driving unit to set the switching unit to the off-state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
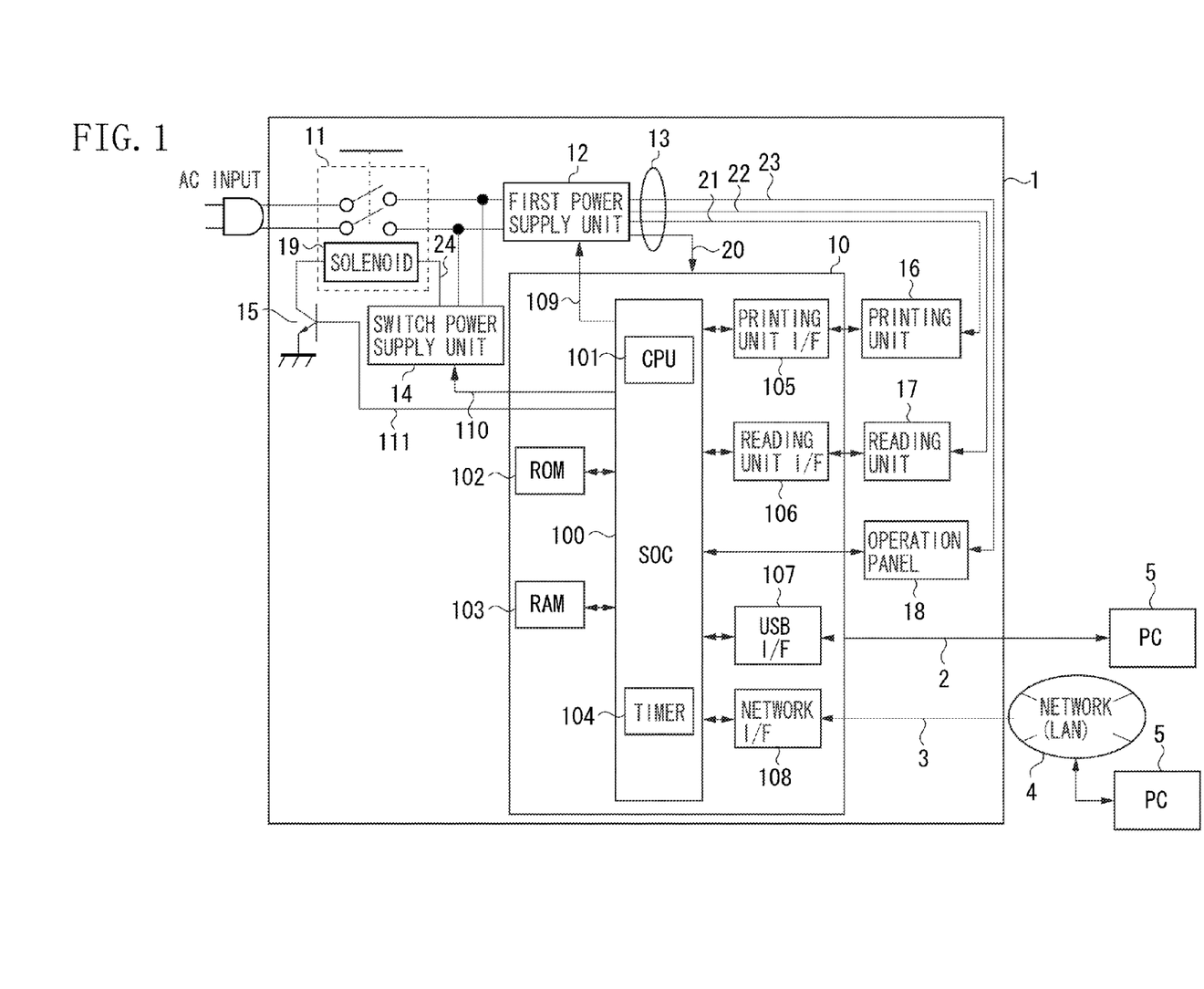
FIG. 1 is a block diagram illustrating an example of a configuration of an image forming apparatus serving as an information processing apparatus according to an exemplary embodiment of the present invention.

FIG. 1 is a block diagram illustrating one example of a configuration of an image forming apparatus serving as an information processing apparatus according to an exemplary embodiment of the present invention.

FIG. 1 illustrates an image forming apparatus 1 according to the present exemplary embodiment. The image forming apparatus 1 is connected to a host computer (hereinafter, referred to as a personal computer "PC") 5 via a universal serial bus (USB) cable 2 or a local area network (LAN) 4.

A control unit 10 controls the entire image forming apparatus 1. For example, the control unit 10 performs image processing on image data read by a reading unit 17 or image data received from the PC 5, which is an external apparatus, and outputs the processed image to a printing unit 16.

The printing unit 16 conveys a recording sheet, prints image data received from the control unit 10 onto the recording sheet as a visible image by an electrophotographic process and the like, and then discharges the sheet with the printed image outside the apparatus. The printing unit 16 includes a sheet feeding unit (not illustrated) including cassettes storing a plurality of types of recording sheets, a marking unit (not illustrated) having a function for transferring and fixing the image data onto the recording sheet, and a sheet discharging unit (not illustrated) having a function for sorting and stapling on the printed recording sheet and then outputting the processed recording sheet outside the apparatus.

A reading unit 17 reads a document as image data and transmits the read image to the control unit 10. The reading unit 17 includes a scanner unit (not illustrated) having a function for reading the document and a document sheet feeding unit (not illustrated) having a function for conveying the document sheet.

An operation panel 18 performs various types of settings for forming the image by the printing unit 16 from the document read by the reading unit 17 based on an operator's (user's) instruction. For example, the operation panel 18 of a touch panel type is used for inputting selections for a number of copies of the images to be formed, information about density when the image is formed, and reading resolution (e.g., 300 dpi or 600 dpi) of the scanner unit for reading the document.

A power supply switch 11 is a toggle-type switch provided on a supply path (power supply path to the image forming apparatus 1) of alternating current (AC) power source to switch the AC power source input of the image forming apparatus 1 on (open the supply path) and off (shut off the supply path). The power supply switch 11 can be switched from an on state to an off state by control from the control unit 10.

A solenoid 19 is a driving source for driving an internal portion of the power supply switch 11. The solenoid 19 drives the power supply switch 11 to switch from the on state (ON)

for opening the supply path of the AC power source to the off state (OFF) for shutting off the supply path thereof. A driving circuit 15 drives the power supply switch 11.

A first power supply unit 12 is a main body power source that inputs the AC power source via the power supply switch 11 to supply power to each unit (load other than that of the driving source of the power supply switch 11) of the image forming apparatus 1. A first power supply unit output 13 indicates the power output for supplying power to each unit of the image forming apparatus 1.

Of the first power supply unit output 13 from the first power supply unit 12, a power supply voltage output 20 is output to the control unit 10. Of the first power supply unit output 13 from the first power supply unit 12, a power supply voltage output 21 is output to the printing unit 16. Of the first power supply unit output 13 from the first power supply unit 12, a power supply voltage output 22 is output to the reading unit 17. Of the first power supply unit output 13 from the first power supply unit 12, a power supply voltage output 23 is output to the operation panel 18.

A switch power supply unit 14 inputs the AC power source via the power supply switch 11 and supplies the power for driving the power supply switch 11 thereto. A power supply voltage output 24 is output from the switch power supply unit 14. The switch power supply unit 14 switches between the supply and the shutoff of power to the power supply switch 11 by control from the control unit 10.

An internal configuration of the control unit 10 will be described below.

A system-on-a-chip (SOC) 100 mainly controls the control unit 10. The SOC 100 includes a central processing unit (CPU) 101 and a timer 104.

A read-only memory (ROM) 102 stores data and a program controlling the image forming apparatus 1. A random access memory (RAM) 103 is used as a region where the CPU 101 develops and executes the program stored in the ROM 102, a storage of the image data, and a work area.

A printing unit interface (printing unit I/F) 105 is an interface portion with the printing unit 16 and outputs an image signal to the printing unit 16 (printer engine). A reading unit interface I/F 106 inputs a reading image signal from the reading unit 17 (scanner engine). The CPU 101 processes the image signal input via the reading unit interface I/F 106 and outputs the image signal as a recording image signal to the printing unit I/F 105.

A USB interface (USB I/F) 107 performs communication processing with the PC 5 via the USB cable 2. The USB I/F 107 and the PC 5 are connected with each other via the USB cable 2.

A network interface (I/F) 108 performs communication processing with the PC 5 via the network (LAN) 4. The network I/F 108 and the network 4 are connected with each other via a communication cable such as a LAN cable 3.

The power supply control (output port control) performed by the SOC 100 will be described below.

The image forming apparatus 1 has a plurality of power states and a function for cutting the AC power source input by executing shutdown when a specified condition is satisfied. A case where the specific condition is satisfied is, for example, when a certain time has elapsed with no instruction input to the image forming apparatus 1.

Controlling the power state of the image forming apparatus 1 by the SOC 100 will be described below.

The SOC 100 outputs a first power supply output control signal 109 to the first power supply unit 12 and controls the first power supply unit output 13 to be turned on/off. When the image forming apparatus 1 is shifted to a power-saving mode, the SOC 100 performs control for stopping the power outputs 21 and 22 respectively to the printing unit 16 and the reading unit 17 with the first power supply output control signal 109. Further, when the power-saving mode is returned to a normal power mode, the SOC 100 performs control for returning the power outputs 21 and 22 respectively to the printing unit 16 and the reading unit 17 with the first power supply output control signal 109.

When the shutdown is executed, the SOC 100 also performs control for stopping the power output 23 to the operation panel 18 with the first power supply output control signal 109. Further, the SOC 100 turns off the power supply switch 11.

When driving the power supply switch 11, the SOC 100 performs control (power supply control) for outputting a switch power supply unit control signal 110 to the switch power supply unit 14 so as to turn on the power output 24 of the switch power supply unit 14. Further, the SOC 100 outputs a power supply switch driving signal 111 to the driving circuit 15.

By the power supply switch driving signal 111, the driving circuit 15 is driven to apply power to the solenoid 19, and then the power supply switch 11 is turned off. In other words, the SOC 100 performs the power supply control of the switch power supply unit 14 with the switch power supply unit control signal 110 and the drive control of the power supply switch 11 with the power supply switch driving signal 111.

Except when the power supply switch 11 is driven, the SOC 100 performs control for stopping the output of the switch power supply unit control signal 110 to turn off the power output 24 of the switch power supply unit 14.

Figure 2:
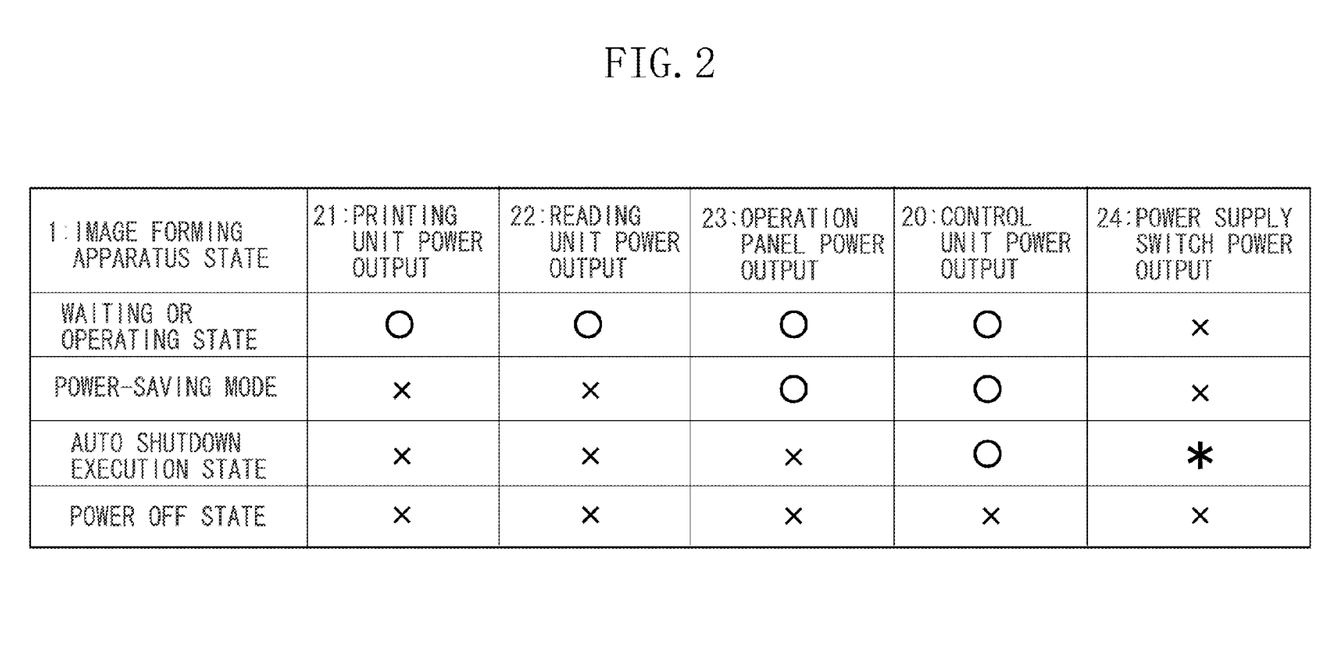
FIG. 2 illustrates a power state of the image forming apparatus according to the present exemplary embodiment.

With reference to FIG. 2, the power state of the image forming apparatus 1 will be described below.

FIG. 2 illustrates the power state of the image forming apparatus 1.

Reference symbols (o, x) illustrated in FIG. 2 indicate the state of the power output to be supplied to each unit of the image forming apparatus 1. The state where the power outputs 21, 22, 23, 20, and 24 are supplied to each unit is indicated with "o", and the stopped state is indicated with "x". The power output for supplying power to each unit is controlled by output port control of the SOC 100.

A "waiting or operating state" illustrated in FIG. 2 indicates a normal state, which is the power state to which the image forming apparatus 1 is shifted after the power supply switch 11 of the image forming apparatus 1 is turned on. In the "waiting or operating state", the first power supply unit 12 supplies the power outputs 21, 22, 23, and 20 respectively to the printing unit 16, the reading unit 17, the operation panel 18, and the control unit 10 from the first power supply unit 12, and thus all functions of the image forming apparatus 1 become available.

In the "waiting or operating state", the power output 24 from the switch power supply unit 14 to the power supply switch 11 is stopped. Thus, the voltage is not applied to the solenoid 19, and wasteful power consumption can be reduced accordingly.

The "power-saving mode" indicates a power-saving state, to which the power state is shifted when a predetermined power-saving state transition time (Tsl) has elapsed with nothing operated by the user in the above-described waiting or operating state. The power-saving state transition time Tsl is a time previously set by a user's instruction via an operation of keys (not illustrated) on a operation panel 18. The set time Tsl is stored in a rewritable region in the ROM 102, and can be read by the CPU 101.

In the "power-saving mode", the power outputs 23 and 20 are respectively supplied to the operation panel 18 and the control unit 10 from the first power supply unit 12. On the other hand, the power outputs 21 and 22 respectively to the printing unit 16 and the reading unit 17 are stopped. Also in the "power-saving mode", the power output 24 from the switch power supply unit 14 to the power supply switch 11 is stopped. Thus, the voltage is not applied to the solenoid 19, and wasteful power consumption can be reduced accordingly.

In other words, the switch power supply unit 14 shuts off the supply of power to the power supply switch 11 by control from the SOC 100 when the image forming apparatus 1 is in the waiting or operating state, or the power-saving mode.

In the "power-saving mode", when the user operates any of operations (1), (2), and (3), for example, the CPU 101 recognizes the operation, and starts the power outputs 21 and 22 with the first power supply output control signal 109, and then the image forming apparatus 1 returns to the "waiting or operating state":
(1) pressing the operation key on the operation panel 18,
(2) inputting the image signal via the network I/F 108, and
(3) inputting the image signal via the USB I/F 107.

An "auto-shutdown execution state" is a state where auto-shutdown is being executed (auto-off driving state), to which the power state is shifted when a predetermined auto-off driving state transition time (Tsh) has elapsed with nothing operated by the user in the above-described power-saving mode. A mark "*" illustrated in FIG. 2 indicates that power is supplied only when driving. The auto-off driving state transition time Tsh is a time previously set by the user's instruction via the operation of the key (not illustrated) on the operation panel 18. The set time Tsh is stored in the rewritable region of the ROM 102, and can be read by the CPU 101.

In the "auto-shutdown execution state", the power output 20 is supplied from the first power supply unit 12 to the control unit 10. On the other hand, the power outputs 21, 22, and 23 respectively to the printing unit 16, the reading unit 17, and operation panel 18 are stopped. In the "auto-shutdown execution state", only when the power supply switch 11 is driven, the power output 24 is output from the switch power supply unit 14 to the power supply switch 11, and in other states, the power supply is stopped. The voltage is applied to the solenoid 19 only when driving. Since the voltage is not applied in other states, wasteful power consumption can be reduced.

A "power off state" is a state where, in the above-described shutdown mode, the shutdown is executed to turn off power. In the "power off state", the power outputs 21, 22, 23, and 20 respectively to the printing unit 16, the reading unit 17, the operation panel 18, and the control unit 10 from the first power supply unit 12 are stopped. Further, in the "power off state", the power output 24 to the power supply switch 11 from the switch power supply unit 14 is also stopped.

Figure 3:
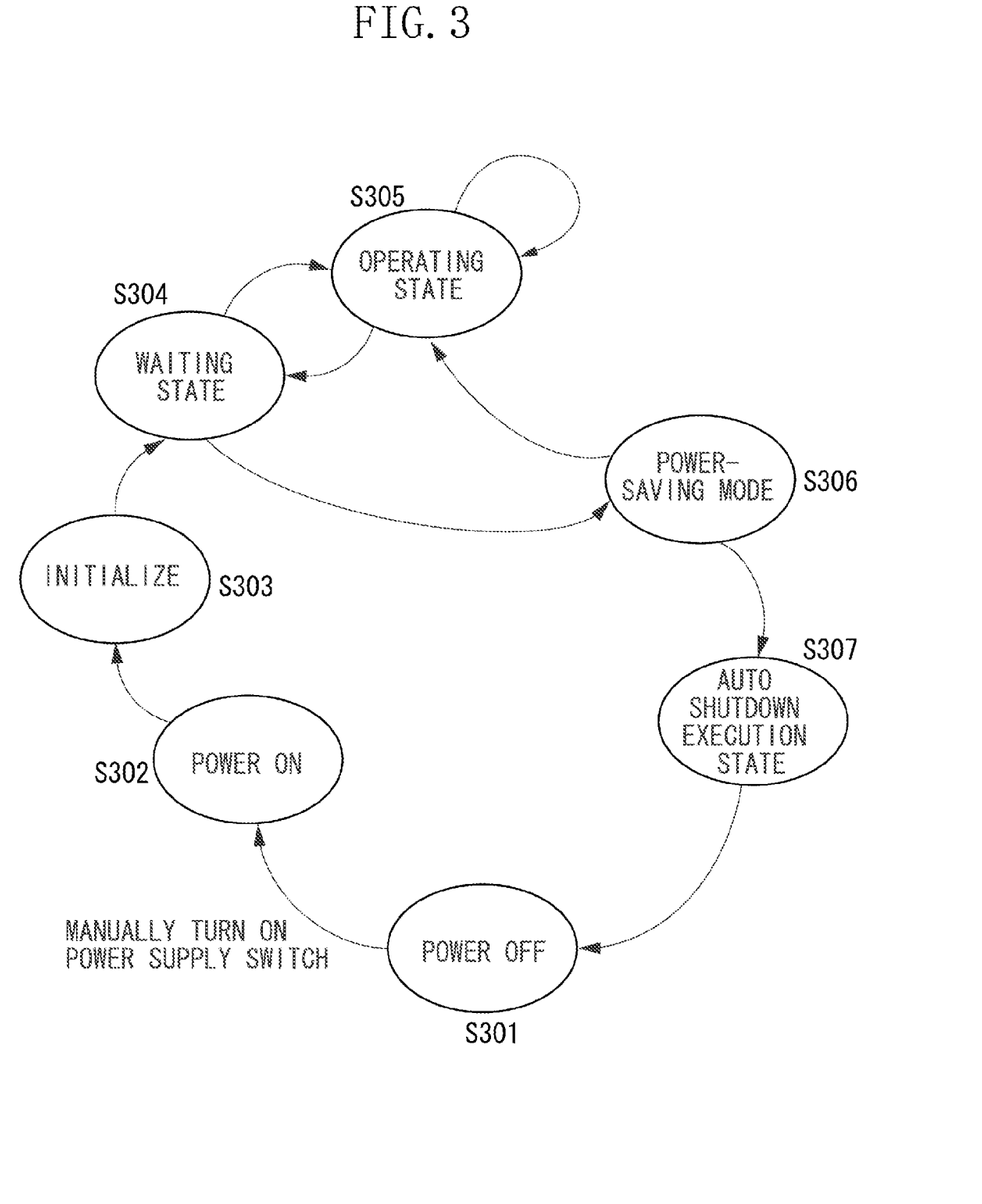
FIG. 3 is a state transition diagram illustrating transition of the power state of the image forming apparatus according to the present exemplary embodiment.

With reference to FIG. 3, an operation, in which the power state of the image forming apparatus 1 is shifted to the auto-off driving state from the normal state so as to automatically switch off the power supply switch 11, will be described.

FIG. 3 is a state transition diagram illustrating transition of the power state of the image forming apparatus 1. S301 to S307 illustrated in FIG. 3 indicate each state.

As illustrated in FIG. 3, S301 indicates that power is off, which means that the power supply switch 11 is in the off state and the image forming apparatus 1 is in the operation-unable state. When the power supply switch 11 is manually turned on by the user, the state is shifted to "power on" in S302, and then is shifted to "initialize" in S303. At this point, the CPU 101 develops the program, which is stored in the ROM 102, in the RAM 103, and subsequently executes the program to initialize each unit.

After the "initialize" ends in S303, the image forming apparatus 1 is shifted to a waiting state in S304, and then waits a job or the like from the user's operation, the USB I/F 107, and the network I/F 108. When the image forming apparatus 1 receives a job in the waiting state in S304, the image forming apparatus 1 is shifted to an operating state in S305.

In the operating state in S305, the job received in the waiting state in S304 is executed. After the job is performed, when the time Ts1 has elapsed, the image forming apparatus 1 is shifted to a power-saving mode in S306. At this point, the SOC 100 controls the first power supply unit 12 to control the power output as illustrated in FIG. 2. Since this state until the time Tsh elapses, a part of input from the operation panel 18 or a job from the USB I/F 107 and the network I/F 108 can be received.

When any of the above-described operations (instructions) (1), (2), and (3) is received in the power-saving mode in S306, the image forming apparatus 1 returns to the operating state in S305.

On the other hand, when the time Tsh has elapsed without new job received in the power-saving mode in S306, the image forming apparatus 1 is shifted to the auto-shutdown execution state in S307. Subsequently, the shutdown is executed to turn off the power supply switch 11, and thus the image forming apparatus 1 is shifted to the power off state in S301.

Figure 6:
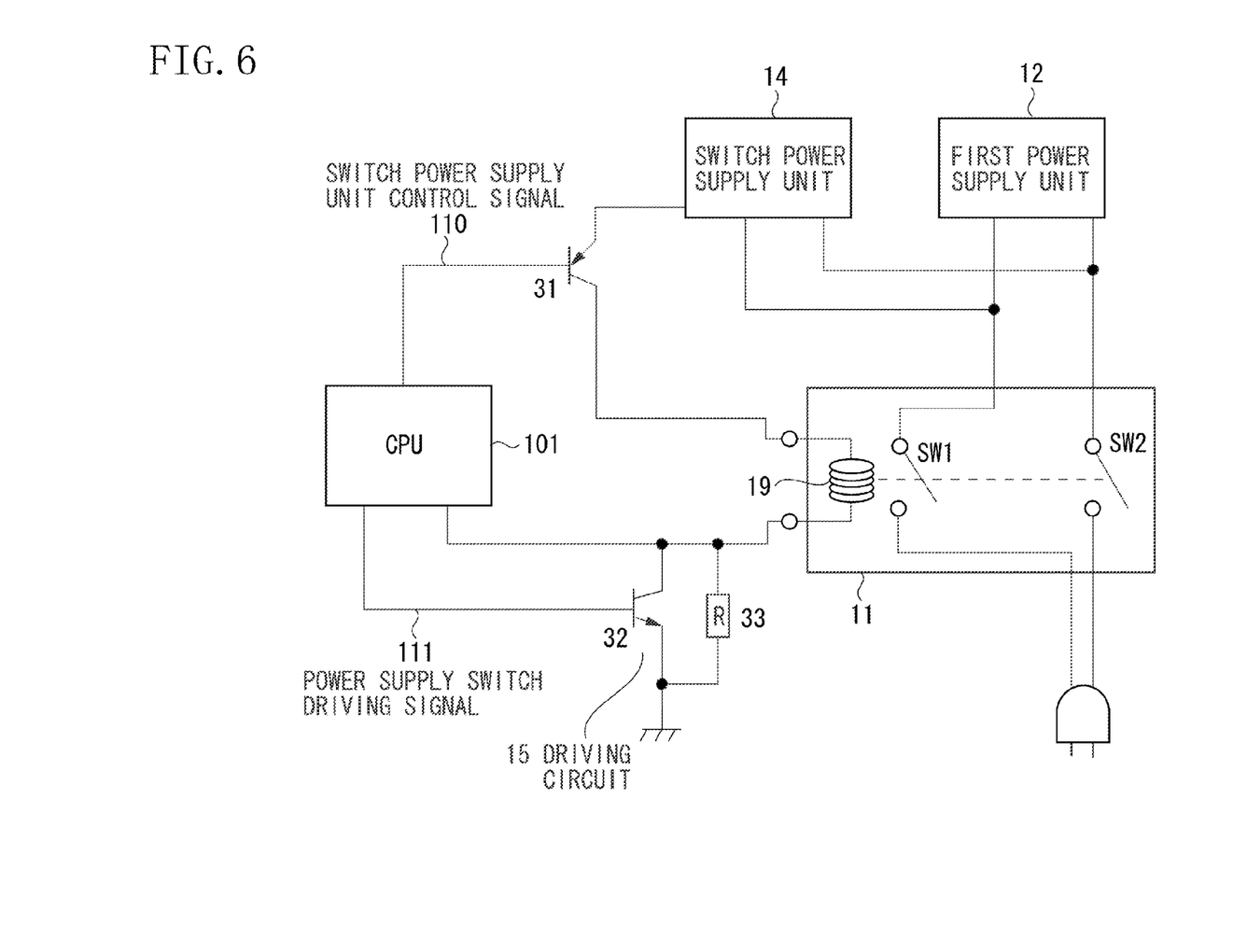
FIG. 6 is a block diagram illustrating a configuration of a power supply switch, a switch power supply unit, and periphery thereof in the present exemplary embodiment.

With reference to FIG. 6, the configuration of the switch power supply unit 14, the power supply switch 11, and the periphery thereof will be described.

The power supply switch 11 is provided with the solenoid 19 therein. When the solenoid 19 is conducted, respective contact points of a switch SW1 and a switch SW2 are opened. With this arrangement, the power supply switch 11 is switched to an off-off state.

The power supply switch 11 according to the present exemplary embodiment is, for example, a rocker switch (seesaw switch), and also a power switch with a mechanical relay of a toggle type that switches the off state for shutting off the power supply to the image forming apparatus 1 from the AC power source to the on state for keeping the power supply to the image forming apparatus 1 therefrom.

A semiconductor switch (transistor) 31 is disposed between the switch power supply unit 14 and the power supply switch 11. The semiconductor switch 31 switches on/off of the voltage to be applied from the switch power supply unit 14 to the power supply switch 11. When a high signal (switch power supply unit control signal 110), for example, is output from an output port of the CPU 101, the semiconductor switch 31 is switched on to apply the voltage to the power supply switch 11.

The driving circuit 15 includes a semiconductor switch (transistor) 32 and resistance 33. The semiconductor switch 32 switches on and off with regard to the current flowing through the power supply switch 11. When a high signal (power supply switch driving signal 111), for example, is output from the output port of the CPU 101, the semiconductor switch 32 is turned on to apply the current to the power supply switch 11.

In other words, the current flows through a circuit having a configuration in which the current flows from the switch power supply unit 14 via the semiconductor switch 31, the solenoid 19, and the semiconductor switch 32 to the ground (GND), and thus the solenoid 19 is electrically conducted. Therefore, a force generated by the solenoid 19 sets the switches SW1 and SW2 to the off state. The resistance 33 is provided so that the current does not flow through the solenoid 19 when the semiconductor switch 32 is in the off state.

The CPU 101 monitors the voltage of the solenoid 19. With this arrangement, the CPU 101 determines whether the voltage applied to the solenoid 19 becomes stable.

The above-described switch SW2 is the seesaw switch that can be operated by the user. The CPU 101 monitors the state of the switch SW2. When the switch SW2 is switched from the on state to the off state by the user's operation, the state (off state) of the switch SW2 is notified to the CPU 101, and then the CPU 101 outputs the switch power supply unit control signal 110 and the power supply switch driving signal 111.

With this arrangement, the switch SW1 is turned to the off state. Further, when a predetermined time has elapsed without any of the above-operations (1), (2), and (3) performed, the auto-shutdown is executed. When the predetermined time has elapsed without any of the above-operations (1), (2), and (3) performed, the CPU 101 outputs the switch power supply unit control signal 110 and the power supply switch driving signal 111. Accordingly, the switches SW1 and SW2 are turned to the off state.

With reference to a flowchart illustrated in FIG. 4, the auto-shutdown control to be performed by the SOC 100 when S306 is shifted to S307 and further S301 will be described below as illustrated in FIG. 3.

Figure 4:
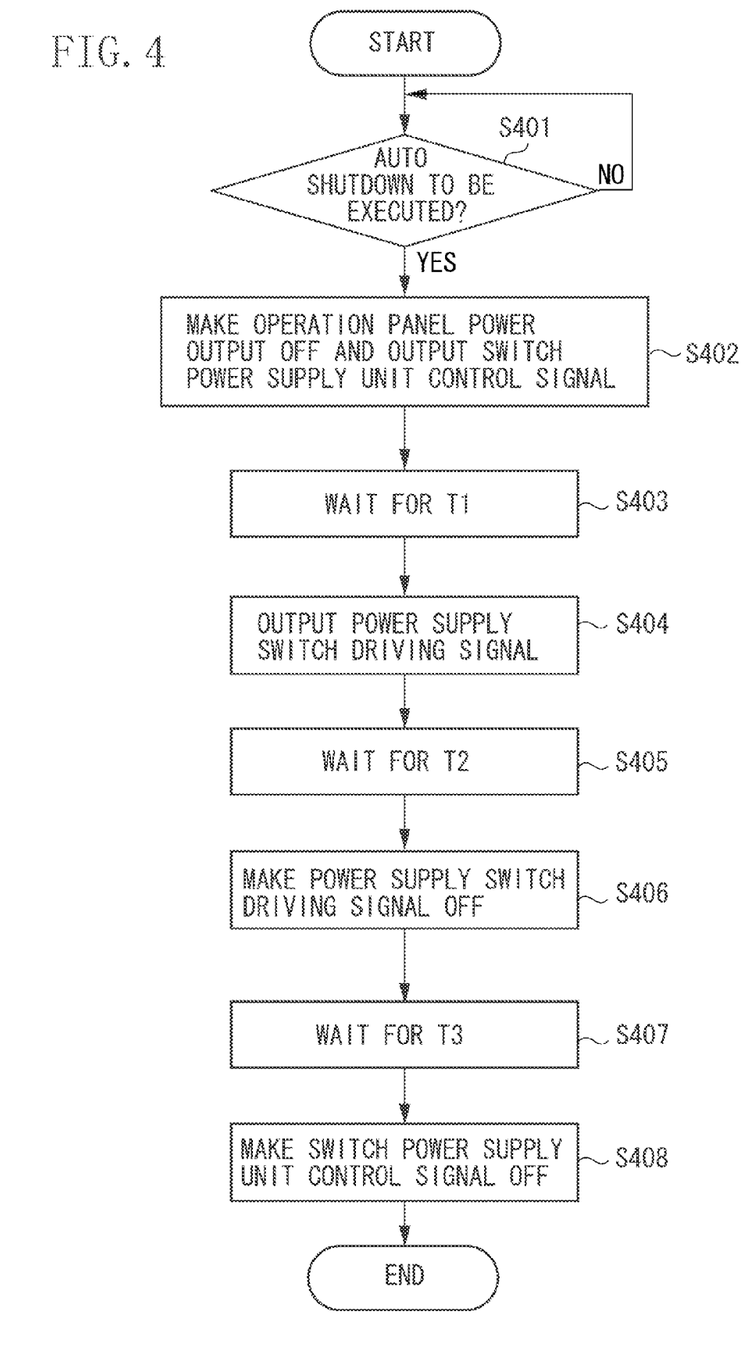
FIG. 4 is a flowchart illustrating an example of auto-shutdown control performed by the image forming apparatus according to the present exemplary embodiment.

FIG. 4 is a flowchart illustrating an example of the auto-shutdown control performed by the image forming apparatus according to the present exemplary embodiment. Processing in this flowchart is recorded readably by the computer into the ROM 102. The processing can be realized when the CPU 101 executes a program developed in the RAM 103 by the CPU 101 at the time of starting. Further, S401 to S408 illustrated in FIG. 4 indicate each step.

The CPU 101 starts the processing of the flowchart when the image forming apparatus 1 is in the saving-power state in S306, in other words, only the control unit power output 20 and the operation panel power output 23 are output from the first power supply unit 12.

In step S401, the CPU 101 determines whether to execute the auto-shutdown. More specifically, when the CPU 101 recognizes that a predetermined auto-off driving state transition time (Tsh) has elapsed with nothing operated by the user, the CPU 101 determines that the auto-shutdown is to be executed.

When it is determined that the auto-shutdown is not to be executed (NO in step S401), the CPU 101 continuously performs determination processing in step S401. When any of the above-described operations (instructions) (1), (2), and (3) is received (not illustrated) in such a state, the CPU 101 returns the image forming apparatus 1 to the operating state in S305.

On the other hand, when it is determined that the auto-shutdown is to be executed (YES in step S401), the CPU 101 proceeds the processing to step S402 to start to execute the auto-shutdown in S307.

In step S402, the CPU 101 makes (stops) the operation panel power output 23 off with the first power supply output control signal 109, and also outputs the switch power supply unit control signal 110 to control the power output 24 to be made on.

With the above-described first power supply output control signal 109, the power output of the first power supply unit 12 includes only the control unit power output 20. Further, by the output of the above-described switch power supply unit control signal 110, the power output 24 for driving the power supply switch 11 is output from the switch power supply unit 14 to the power supply switch 11 to apply the voltage to the solenoid 19.

In step S403, the CPU 101 waits until a time T1 for stabilizing the power output 24 of the switch power supply unit 14 elapses (refer to "T1" illustrated in FIG. 5 and described below).

In step S404, the CPU 101 starts to output the power supply switch driving signal 111. In other words, after the voltage starts to be applied to the solenoid 19, the CPU 101 outputs the power supply switch driving signal 111 after a predetermined time has elapsed. By the output of the power supply switch driving signal 111, the solenoid 19 is driven and then the off operation of the power supply switch 11 starts.

In step S405, the CPU 101 waits until a time T2 elapses (refer to "T2" illustrated in FIG. 5 and described below) with the power supply switch driving signal 111 output. After the time T2 has elapsed, in step S406, the CPU 101 makes (stops) the power supply switch driving signal 111 off.

As a result of the processing, the solenoid 19 is driven during the time T2, and thus the power supply switch 11 can be securely turned off. When the power supply switch 11 is turned off, the power output 24 of the switch power supply unit 14 and the first power supply unit output 13 of the first power supply unit 12 are reduced accordingly.

In step S407, the CPU 101 waits until a time T3 elapses (refer to "T3" illustrated in FIG. 5 and described below), and then in step S408, the CPU 101 makes (stops) the switch power supply unit control signal 110 off.

Figure 5:
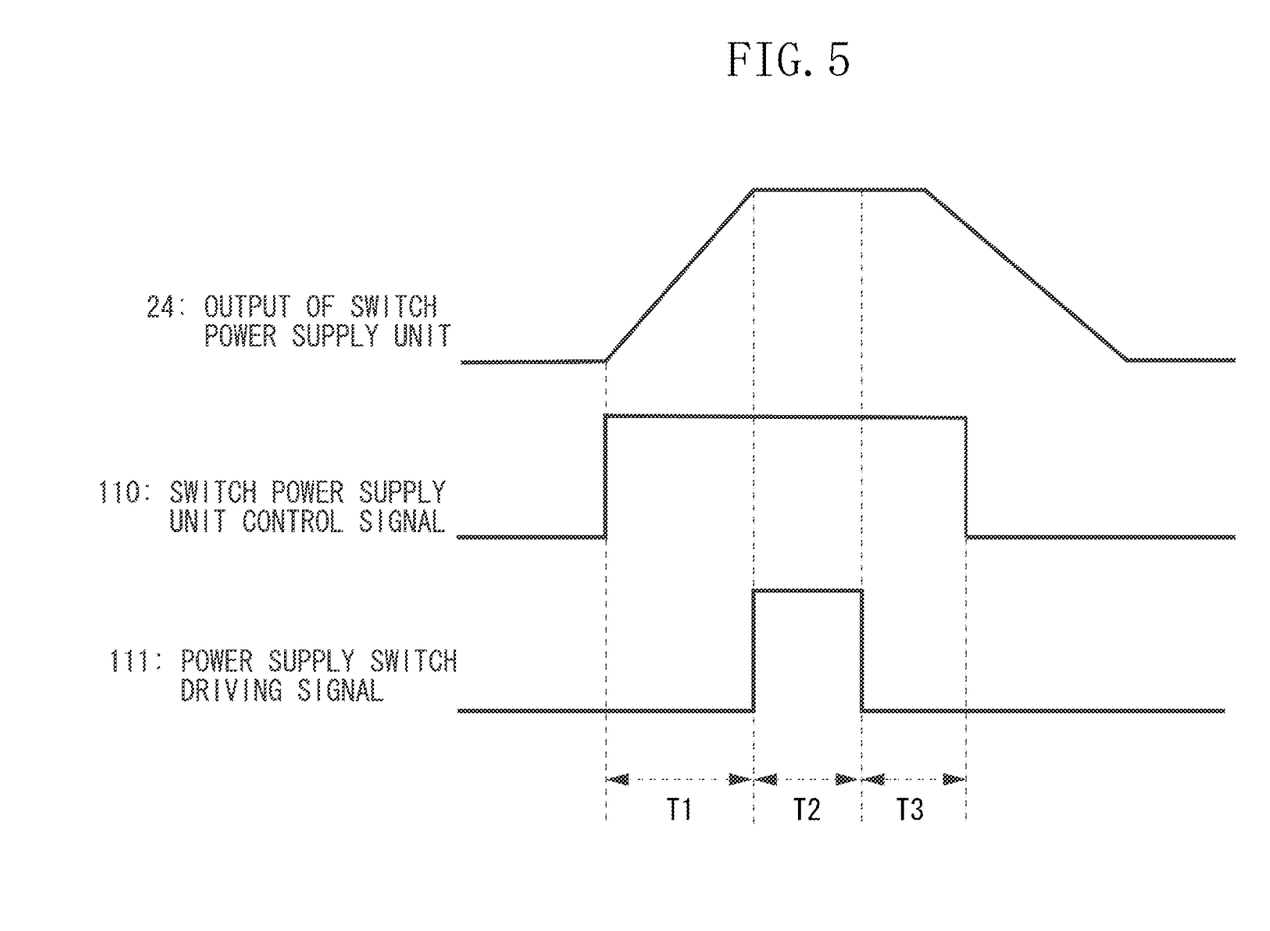
FIG. 5 illustrates the auto-shutdown control performed by the image forming apparatus according to the present exemplary embodiment.

FIG. 5 illustrates the auto-shutdown control described above.

FIG. 5 illustrates the auto-shutdown control performed by the image forming apparatus according to the present exemplary embodiment.

As illustrated in FIG. 5, the time T1 is a period for waiting for stabilization of the power output 24 of the switch power supply unit 14 (corresponding to step S403 illustrated in FIG. 4). After the power supply output is stabilized, the solenoid 19 is driven by the driving circuit 15 only during the time T2 (corresponding to steps S404 to S406 illustrated in FIG. 4), and then the power supply switch 11 is securely turned off.

Since the power supply switch 11 is turned off after the time T2 has elapsed, the power output 24 of the switch power supply unit 14 is reduced accordingly. Similarly, the first power supply unit output 13 of the first power supply unit 12 is reduced. The control unit 10 that has detected the reduction performs the ending operation (corresponding to steps S407 and S408 illustrated in FIG. 4).

As described above, when switching the power supply switch 11 to the off state, the CPU 101 supplies the power output 24 for driving the power supply switch 11 from the switch power supply unit 14 to the power supply switch 11 with the switch power supply unit control signal 110, and subsequently controls the power supply switch 11 to be turned off with the power supply switch driving signal 111.

With this configuration, in the waiting or operating state and in the power-saving mode, the wasteful voltage is not applied to the power supply switch 11 (solenoid 19). Therefore, the wasteful power consumption can be reduced, and the power consumption in the waiting or operating state and in the power-saving mode can be further reduced.

According to the above-described exemplary embodiment, a configuration in which the switch power supply unit 14 is separately provided from the first power supply unit 12 is described. However, the present exemplary embodiment can be configured with only the first power supply unit 12.

For example, the power output 24 to be supplied to the power supply switch 11 is output from the first power supply unit 12. Only when the power supply switch 11 is switched to the off state, the CPU 101 performs control so that the power output 24 should be output from the first power supply unit 12, and subsequently the power supply switch 11 should be turned off with the power supply switch driving signal 111. With such a configuration, the similar effect to that of the above exemplary embodiment can be expected.

As described above, according to the image forming apparatus of the present exemplary embodiment, right before the power supply switch 11 with the mechanical relay performs the auto-off driving (the time T1 before according to the present exemplary embodiment), the power source voltage is applied to the power supply switch 11 and then the power supply switch 11 is driven, so that the wasteful power consumption in the image forming apparatus can be reduced, thereby realizing the apparatus of an excellent power-saving type.

When a condition is satisfied for shifting the power state of the image forming apparatus 1 from a first power state (waiting or operating state and power-saving mode) to a second power state (power off state), the SOC 100 of the image forming apparatus 1 according to the present exemplary embodiment controls the switch power supply unit 14 to supply power to the power supply switch 11 (first switching processing), and after the predetermined time has elapsed (after the time T1 has elapsed), the SOC 100 controls the power supply switch 11 to shut off the supply of power to the image forming apparatus 1 (second switching processing).

When the predetermined time has elapsed without instruction input to the image forming apparatus 1, the SOC 100 determines that the condition for shifting the power state of the image forming apparatus 1 from the first power state to the second power state is satisfied.

After the predetermined time has elapsed (after the time T1 has elapsed), the SOC 100 outputs the power supply switch driving signal 111 to the driving circuit 15 of the power supply switch 11 continuously for the predetermined time (continuously for the time T2) to shut off the supply of power to the image forming apparatus 1 by the power supply switch 11.

Further, the SOC 100 controls the switch power supply unit 14 so that power to the power supply switch 11 is shut off when the predetermined time has elapsed (when the time T3 has elapsed) after the power supply switch driving signal 111 has been output (switch power supply unit control signal is made off).

The above described configuration and content of various types of data are not limited thereto, but can be configured by various types of configurations and content according to usages and purposes.

One exemplary embodiment is described as above, and the present invention can be realized by the exemplary embodiment such as a system, an apparatus, a method, a program, and a storage medium. More specifically the present invention may be applied to a system configured by a plurality of devices or a single device.

The configuration in which the above-described exemplary embodiments are combined with each other is also included in the present invention.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-031372 filed Feb. 16, 2012, which is hereby incorporated by reference herein in its entirety.

What is claimed is:

1. An information processing apparatus comprising:
a switching unit configured to be in an ON-state in which power is supplied to the information processing apparatus and an OFF-state in which power is not supplied to the information processing apparatus in accordance with a user operation;
a driving unit configured to set the switching unit to the OFF-state;
a power supply unit configured to supply power to the driving unit; and
a control unit configured to, in a case where a condition for shutting off power supply to the information processing apparatus is satisfied, control the power supply unit to generate the power to be supplied to the driving unit and perform control so that the power generated by the power supply unit is supplied to the driving unit,
wherein the driving unit to which the power is supplied sets the switching unit to the OFF-state.

2. The information processing apparatus according to claim 1, wherein, when a first predetermined time has elapsed after the control unit controls the power supply unit to generate the power, the control unit is configured to perform control so that the power generated by the power supply unit is supplied to the driving unit.

3. The information processing apparatus according to claim 1, wherein, when the power generated by the power supply unit is stabilized, the control unit is configured to perform control so that the power generated by the power supply unit is supplied to the driving unit.

4. The information processing apparatus according to claim 1, wherein the power generated by the power supply unit is supplied to the driving unit for a second predetermined time.

5. The information processing apparatus according to claim 1, wherein the condition is that a third predetermined time has elapsed without any job received, or without any input of a job by a user with an operation panel.

6. The information processing apparatus according to claim 1, the switching unit is a mechanical switch of a toggle type that switches between the ON-state for supplying power to the information processing apparatus and the OFF-state for shutting off the supply of power thereto.

7. The information processing apparatus according to claim 6,
wherein the driving unit includes a solenoid; and
wherein power is supplied to the solenoid to set the mechanical switch to the OFF-state.

8. The information processing apparatus according to claim 1, further comprising a first semiconductor switch configured to be switched on and off,
    wherein, when the condition for shutting off the power supply to the information processing apparatus is satisfied, the control unit is configured to switch the first semiconductor switch from an OFF-state to an ON-state to supply the power generated by the power supply unit to the driving unit.

9. A method for controlling an information processing apparatus having a switching unit configured to be in an ON-state in which power is supplied to the information processing apparatus and an OFF-state in which power is not supplied to the information processing apparatus in accordance with a user operation, the method comprising:
    setting the switching unit to the OFF-state;
    supplying power to a solenoid, in a case where a condition for shutting off the supply of power to the information processing apparatus is satisfied; and
    causing, after power is supplied to the solenoid, the switching unit to be OFF-state by flowing current to the solenoid.

10. The method for controlling an information processing apparatus according to claim 9, wherein the condition is that a predetermined time has elapsed without any job received, or without any input of a job by a user with an operation panel.

* * * * *